US011618582B2

(12) United States Patent
Sipprell (10) Patent No.: US 11,618,582 B2
(45) Date of Patent: Apr. 4, 2023

(54) AIRCRAFT FUEL TANK INERTING SYSTEM

(71) Applicant: Eaton Intelligent Power Limited, Dublin (IE)

(72) Inventor: Stephen E. Sipprell, Mission Viejo, CA (US)

(73) Assignee: Eaton Intelligent Power Limited, Dublin (IE)

( * ) Notice: Subject to any disclaimer, the term of this patent is extended or adjusted under 35 U.S.C. 154(b) by 392 days.

(21) Appl. No.: 16/835,540

(22) Filed: Mar. 31, 2020

(65) Prior Publication Data

US 2020/0307821 A1 Oct. 1, 2020

Related U.S. Application Data

(60) Provisional application No. 62/827,321, filed on Apr. 1, 2019.

(51) Int. Cl.
B64D 37/32 (2006.01)

(52) U.S. Cl.
CPC .................. B64D 37/32 (2013.01)

(58) Field of Classification Search
CPC ........ B64D 37/32; B64D 37/005; Y02T 50/40
See application file for complete search history.

(56) References Cited

U.S. PATENT DOCUMENTS

| 6,830,219 | B1 | 12/2004 | Picot et al. |
| 6,997,970 | B2 | 2/2006 | Crome |
| 7,007,893 | B2 | 3/2006 | Loss et al. |
| 7,152,635 | B2 | 12/2006 | Moravec et al. |
| 8,074,932 | B2 | 12/2011 | Surawski |
| 9,072,921 | B2 * | 7/2015 | Ribarov ............. A62C 99/0018 |
| 10,737,800 | B2 * | 8/2020 | Massie ................ B64D 37/005 |
| 2011/0256042 | A1 | 10/2011 | Tichborne et al. |
| 2012/0193479 | A1 | 8/2012 | Roscoe et al. |
| 2015/0041011 | A1 | 2/2015 | Tiger |
| 2018/0094557 | A1 | 4/2018 | Zopey et al. |

FOREIGN PATENT DOCUMENTS

| EP | 1250259 A1 | 10/2002 |
| EP | 2965992 A1 | 1/2016 |

OTHER PUBLICATIONS

Faa: "DOT/FAA/AR-04/8 Limiting Oxygen Concentration Required to Inert Jet Fuel Vapors Existing at Reduced Fuel Tank Pressures—Fina l Phase", Aug. 23, 2004 (Aug. 23, 2004), pp. 1-43, XP055722557, Washington, D.C. Retrieved from the Internet: URL:https://www.fire.tc.faa.gov/pdf/04-8.pdf [retrieved on Aug. 14, 2020].
European Search Report, EP20167423, dated Aug. 17, 2020.

* cited by examiner

Primary Examiner — Seung H Lee
(74) Attorney, Agent, or Firm — Merchant & Gould P.C.

(57) ABSTRACT

An aircraft fuel tank inerting system may include at least one fuel tank, at least one surge tank, an inert air assembly, at least one fluid valve connected to the at least one fuel tank, the at least one surge tank, and the inert air assembly, and/or an electronic control unit. The electronic control unit may control the at least one fluid valve to provide inert air from the inert air assembly to the at least one fuel tank and/or to the at least one surge tank. The electronic control unit may control the at least one fluid valve to provide inert air from the inert air assembly to the fuel tank during a climb phase of a flight and control the at least one fluid valve to provide inert air from the inert air assembly to the at least one surge tank during a descent phase of the flight.

19 Claims, 6 Drawing Sheets

AIRCRAFT FUEL TANK INERTING SYSTEM

CROSS-REFERENCE TO RELATED APPLICATIONS

This application claims priority to U.S. Provisional Application No. 62/827,321, filed on Apr. 1, 2019, the contents of which are herein incorporated by reference in their entirety.

TECHNICAL FIELD

The present disclosure generally relates to fuel systems, including systems and methods of inerting fuel tanks that may be used in aerospace applications.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some inerting systems may not operate efficiently and/or may be relatively heavy.

There is a desire for solutions/options that minimize or eliminate one or more challenges or shortcomings of inerting systems. The foregoing discussion is intended only to illustrate examples of the present field and should not be taken as a disavowal of scope.

SUMMARY

In embodiments, an aircraft fuel tank inerting system may include a fuel tank, a surge tank, an inert air assembly, a fluid valve connected to the fuel tank, the surge tank, and the inert air assembly, and/or an electronic control unit. The electronic control unit may be configured to control the fluid valve to provide inert air from the inert air assembly to the fuel tank and/or to the surge tank. The electronic control unit may be configured to control the fluid valve to provide inert air from the inert air source to the fuel tank during a climb phase of a flight and control the fluid valve to provide inert air from the inert air source to the surge tank during a descent phase of the flight.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
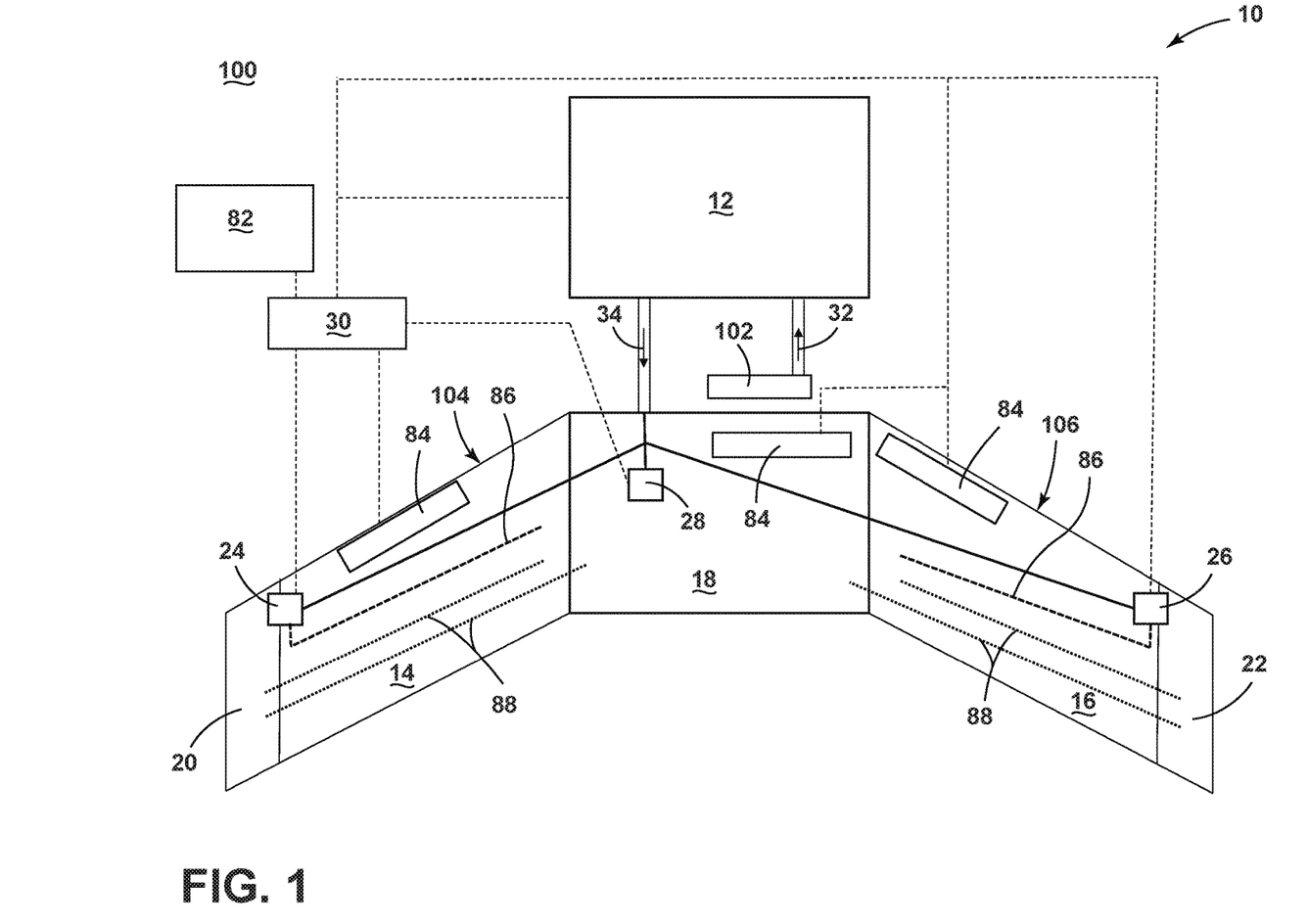
FIG. 1 is a schematic view generally illustrating an embodiment of an aircraft fuel tank inerting system according to teachings of the present disclosure.

In embodiments, such as generally illustrated in FIG. 1, an aircraft fuel tank inerting system 10 may include an inert air assembly 12, one or more main fuel tanks 14, 16, 18 (e.g., a left wing tank 14, a right wing tank 16, and/or a center tank 18), one or more surge tanks 20, 22 (e.g., a left wing surge tank 20 and/or a right wing surge tank 22), one or more fluid valves 24, 26, 28 (e.g., a first fluid valve 24, a second fluid valve 26, and/or a third fluid valve 28), and/or an electronic control unit (ECU) 30. The aircraft fuel tank inerting system 10 may be configured to maintain certain maximum levels of oxygen ($O_2$) in the air in the fuel tanks 14, 16, 18, such as to reduce or eliminate the risk of a fire or explosion.

Figure 2:
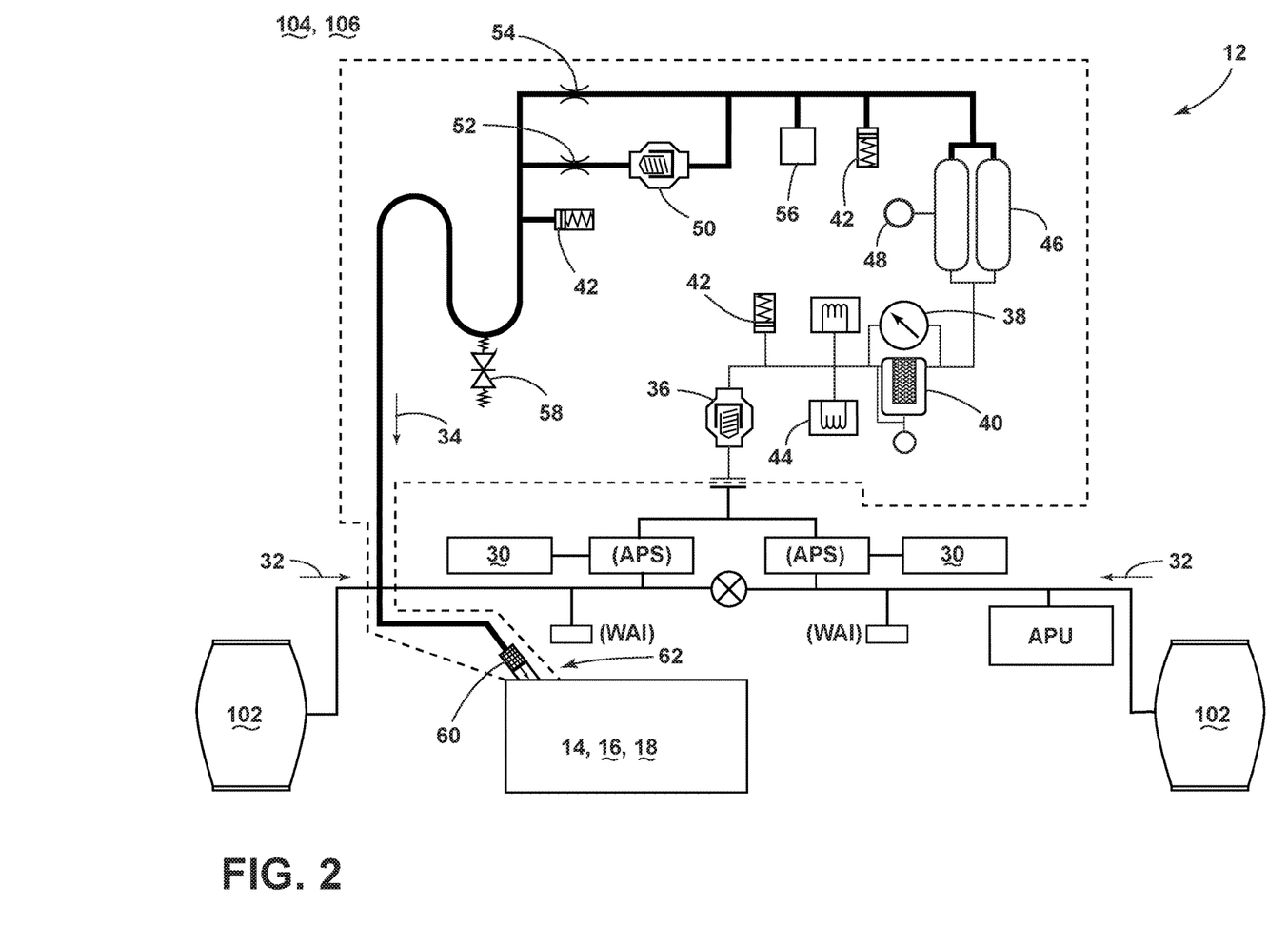
FIG. 2 is a schematic view generally illustrating an embodiment of an aircraft fuel tank inerting system according to teachings of the present disclosure.

With embodiments, such as generally illustrated in FIGS. 1 and 2, the inert air assembly 12 may be configured to receive fluid, such as bleed air 32 from the aircraft engines 102 and provide inert air 34. The inert air 34 may, for example and without limitation, include nitrogen enriched air (NEA). The bleed air 32 from the engines 102 may flow to a bleed air isolation valve 36 of the inert air assembly 12. The bleed air 32 may then flow to a pressure switch 38 (e.g., a differential pressure switch) and a filter/ozone converter 40 that may be connected in parallel. A pressure sensor 42 and/or a temperature sensor 44 may be connected between (i) the isolation valve 36 and (ii) the pressure switch 38 and the filter/ozone converter 40. Water may be removed from the bleed air 32 and drained. The bleed air 32 may flow to one or more air separation modules (ASM) 46. The ASM(s) 46 may be configured to reduce the amount of oxygen in the bleed air 32 and/or increase the amount of nitrogen (or other inert gas) in the bleed air 32, such as to provide inert air 34. The ASM(s) 46 may be configured to provide inert air 34 that may include less than 20% oxygen, less than 15% oxygen, less than 10% oxygen, and/or less than 5% oxygen, or other levels of oxygen. Oxygen enriched air (OEA) may be a byproduct of the ASMs 46 and may be vented, such as via a ram air exit 48. The inert air 34 may be provided to the tanks 14, 16, 18, such as via a flow control valve 50, a high flow orifice 52, and/or a low flow orifice 54. A pressure sensor 42 and/or an oxygen sensor 56 may be connected at or about an outlet of the ASM(s) 46. A pressure sensor 42 and/or a drain/pressure relief valve 58 may be connected between the orifice(s) 52, 54 and a flame arrestor/check valve 60 that may be disposed at the inert air outlet 62 of the inert air assembly 12.

In embodiments, an ECU 30 may be configured to control one or more portions of the inert air assembly 12, such as, for example and without limitation, the bleed air isolation valve 36, the differential pressure switch 38, the filter/ozone converter 40, the ASM(s) 46, and/or the flow control valve 50. The inert air assembly 12 may, for example and without limitation, be disposed at least partially in a wing 104, 106 of an aircraft 100, such as in a fairing of a wing 104, 106.

Figure 3:
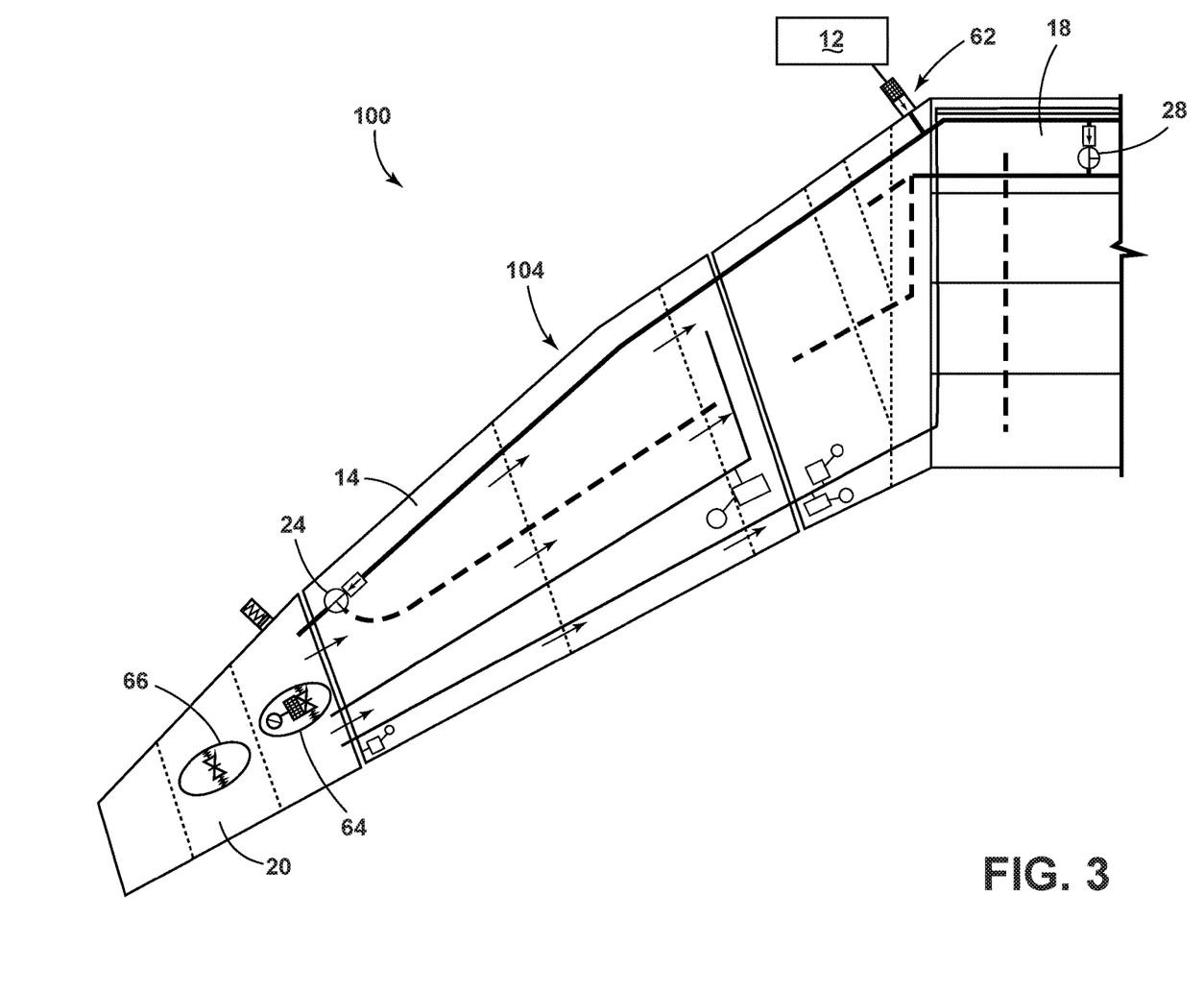
FIG. 3 is a schematic view generally illustrating an embodiment of an aircraft fuel tank inerting system according to teachings of the present disclosure.

With embodiments, such as generally illustrated in FIG. 3, an aircraft 100 may include one or more main fuel tanks 14, 16, 18, such as a left wing tank 14, a right wing tank 16, and/or a center tank 18. Additionally or alternatively, an aircraft 100 may include one or more surge tanks 20, 22, such as a left surge tank 20 and a right surge tank 22. The surge tanks 20, 22 may be configured to receive fuel from the main fuel tanks 14, 16, 18, such as if high temperatures cause fuel in the main tanks 14, 16, 18 to expand, fuel slosh due to maneuvering, and/or refuel overflow. The aircraft fuel inerting system 12 may be configured to provide inert air 34 to some or all of the tanks 14, 16, 18.

Figure 4A:
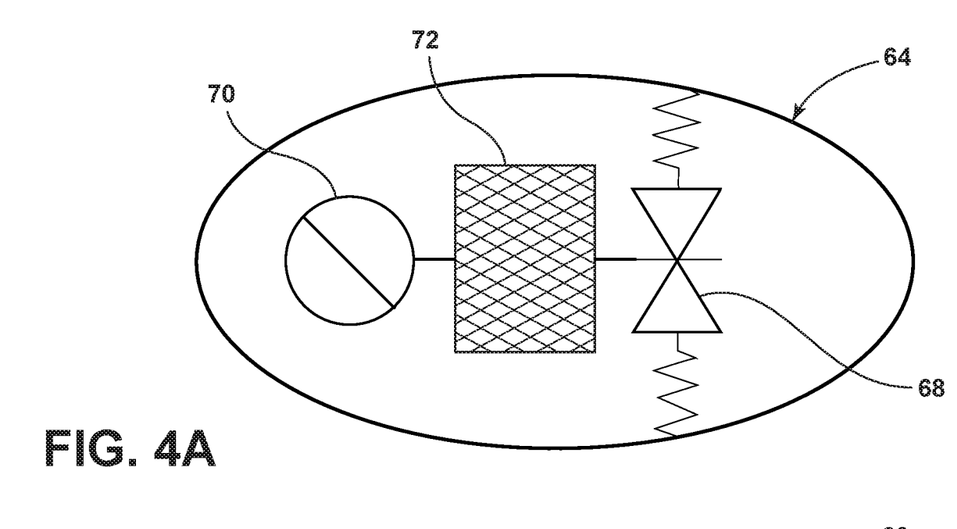
FIGS. 4A and 4B are schematic views generally illustrating surge tanks components of an embodiment of an aircraft fuel tank inerting system according to teachings of the present disclosure.
Figure 4B:
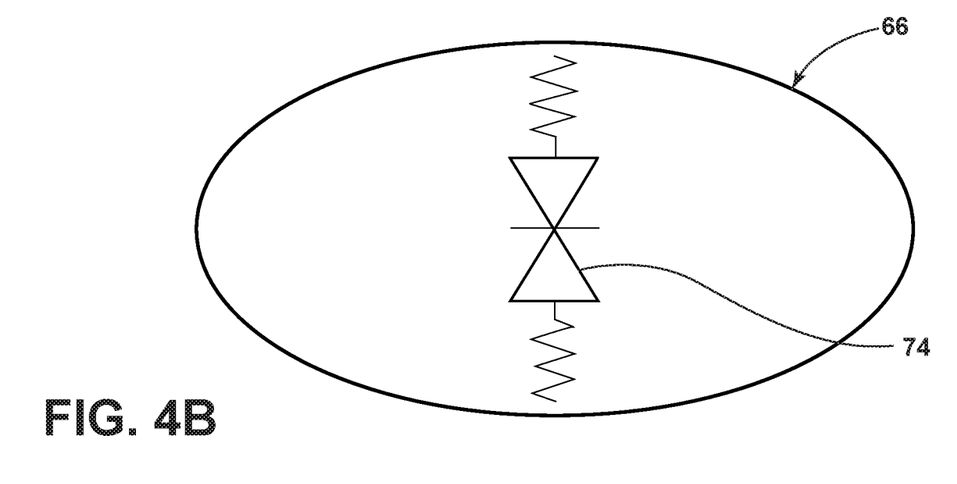

In embodiments, such as generally illustrated in FIGS. 3, 4A, and 4B, the surge tanks 20, 22 may include one or more surge tank components 64, 66. For example and without limitation, the surge tanks 20, 22 may include one or more climb and dive valve 68, depressurization valve 70 (e.g., for refueling and emergency descent), a flame arrestor 72, and/or one or more drains/pressure relief valves 74. The surge tank components 64, 66 may be in fluid communication with the environment (e.g., ambient/outside air) and may be configured to vent air from the tanks 14, 16, 18 if the pressure in the tanks 14, 16, 18 is above a threshold and/or may be configured to receive external air if the pressure in the tanks 14, 16, 18 (or a pressure differential) is below a threshold. The surge tanks 20, 22 may be disposed at or about outer ends of the wings 104, 106 of an aircraft 100.

Figure 5A:
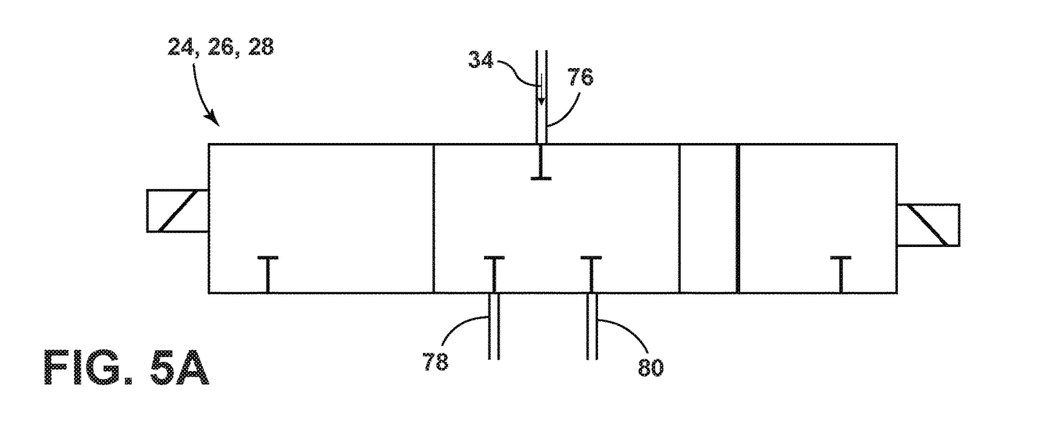
FIGS. 5A-5C are schematic views generally illustrating a fluid valve of an embodiment of an aircraft fuel tank inerting system in different positions according to teachings of the present disclosure.
Figure 5B:
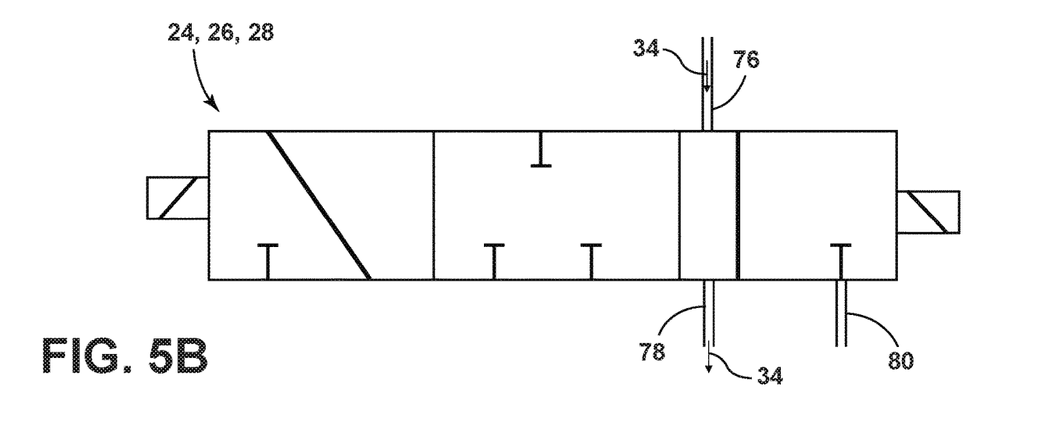
Figure 5C:
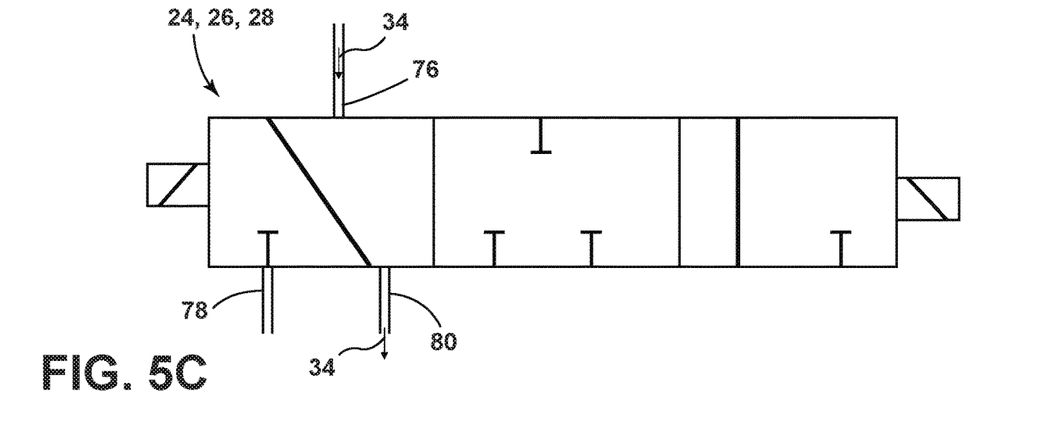

With embodiments, such as generally illustrated in FIGS. 1, 3, and 5A-5C, the aircraft fuel tank inerting system 10 may include one or more fluid valves 24, 26, 28. For example and without limitation, an aircraft fuel tank inerting system 12 may include a fluid valve 24, 26 for each surge tank 20, 22, but a fluid valve 28 could be utilized with more than one surge tank 20, 22. A fluid valve 24, 26, 28 may be configured to control the flow of inert air 34 (from the inert air assembly 12) into the tanks 14, 16, 18. An inlet 76 of the fluid valve 24, 26, 28 may be in fluid communication with an outlet 62 of the inert air assembly 12. A first outlet 78 of the fluid valve 24, 26, 28 may be in fluid communication with a main/wing tank 14, 16, 18. A second outlet 80 of the fluid valve 24, 26, 28 may be fluid communication with a surge tank 20, 22. In a first/closed position, as generally illustrated in FIG. 5A, the fluid valve 24, 26, 28 may block fluid communication between the inlet 76, and the first and second outlets 78, 80 (e.g., may not provide inert air 34 to any of the tanks 14, 16, 18, 29, 22), such as to enable the execution of BIT (built-in-test) to check for latent failures of the fluid distribution system. In a second/open position, as generally illustrated in FIG. 5B, the fluid valve 24, 26, 28 may provide fluid communication between the inlet 76 and the first outlet 28 (e.g., provide inert air 34 to a main/wing tank 14, 16, 18). In a third/bypass position, as generally illustrated in FIG. 5C, the fluid valve 24, 26, 28 may provide fluid communication between the inlet 76 and the second outlet 80 (e.g., provide inert air 34 to a surge tank 20, 22). The fluid valve 24, 26, 28 may be disposed in a main tank 14, 16, 18, partially in a surge tank 20, 22, or entirely in a surge tank 20, 22.

In embodiments, the ECU 30 may be configured to control operation of the fluid valve(s) 24, 26, 28, such as between the closed, open, and bypass positions. The ECU 30 may operate a fluid valve 24, 26, 28 (e.g., the first fluid valve 24, the second fluid valve 26, and/or the third fluid valve 28) in a closed position if air in the fuel tanks 14, 16, 18 has a sufficiently low oxygen concentration and/or if the aircraft 100 is on the ground. The ECU 30 may be connected to a sensor 82 (e.g., a weight on wheels sensor) that may indicate whether the aircraft 100 to which the ECU 30 is connected is on the ground. If the ECU 30 determines that the aircraft 100 is on the ground, the ECU 30 may operate (or maintain) the fluid valve 24, 26, 28 in the closed position. Additionally or alternatively, the ECU 30 may operate the fluid valve in the closed position during a cruise phase of a flight if the tanks 14, 16, 18 reach a sufficient inert margin (e.g., oxygen concentration at about 14% or below). The ECU 30 may operate the fluid valve in the closed position for testing, such as built-in-test (BIT) functions, that may evaluate operation of one or more other valves 14, 16, 18 in the fuel tank inerting system 10. The ECU 30 may be configured to independently control the first fluid valve 24, the second fluid valve 26, and the third fluid valve 28. The ECU 30 may be connected to one or more sensors 84 that may be configured to obtain information about the tanks 14, 16, 18, such as, for example and without limitation, oxygen sensors that may provide information about the concentration of oxygen in the air in the tanks 14, 16, 18.

With embodiments, the ECU 30 may operate the fluid valve 24, 26, 28 in an open/second position during a climb phase of a flight and/or during a cruise phase of the flight (e.g., if the tanks have not reached a sufficient inert margin). In the open position, the fluid valve may provide inert air 34 from the inert air assembly 12 to a tank 14, 16, 18 via one or more first fluid conduits 86. The inert air 34 may flow into the first fluid conduits 86 and may exit the first fluid conduits 86 into the tanks 14, 16, 18 at one or more locations along the first fluid conduits 86. The inert air 34 may mix with the tank air, which may have a higher oxygen concentration than the inert air 34, to reduce the oxygen concentration of the tank air, such as to a level below a threshold (e.g., 12% under 20,000 feet, and 14% between 20,000 feet and a cruise ceiling of about 43,000 feet).

In embodiments, the ECU 30 may be configured to operate a fluid valve 24, 26, 28 in a bypass/third position. In the bypass position, the fluid valve 24, 26, 28 may provide inert air 34 from the inert air assembly 12 to a surge tank 20, 22. The ECU 30 may operate the fluid valve 24, 26, 28 in the bypass position during a descent phase of a flight and/or if the pressure in the tanks 14, 16, 18 is significantly lower than an ambient air pressure. In such circumstances, outside/ambient air may flow into the surge tank 20, 22 and then into the main tanks 14, 16, 18 to equalize the pressure in the main tanks, at least to some degree. The ambient air entering the surge tank 20, 22 may include a relatively high concentration of oxygen, such as about 20-22%. The fluid valve 24, 26, 28 may provide the inert air 34 to the surge tank 20, 22, and the inert air 34 may mix with the ambient air in the surge tank 20, 22 (e.g., the surge tank 20, 22 may act as a mixing chamber). The resulting mixed air may include a reduced oxygen concentration. For example and without limitation, the mixed air may include an oxygen concentration of about 14-16%. The mixed air may flow from the surge tank 20, 22 into second fluid conduits 88 that may be connected to one or more main tanks 14, 16, 18. The mixed air may flow through the second fluid conduits 88 and may exit the second fluid conduits 88 into the main tank(s) 14, 16, 18 at one or more locations along the second fluid conduits 88. The mixed air may continue to mix in the second fluid conduits 88.

In embodiments, a first fluid valve 24 may be connected to the left wing tank 14 and the left surge tank 20, a second fluid valve 26 may be connected to the right wing tank 16 and the right surge tank 22, and/or a third fluid valve 28 may be connected to the center tank 18 and one or both of the surge tanks 20, 22. The first fluid valve 24 and the second fluid valve 26 may include substantially the same configuration (e.g., with closed, open, and bypass positions). The third fluid valve 28 may include a different configuration than the first and second fluid valves 24, 26. For example and without limitation, the third fluid valve 28 may include a closed position and an open position and may not include a bypass position. The ECU 30 may operate the third fluid valve 28 in the open position to reduce the oxygen concentration in the center tank 18.

With embodiments, the second fluid conduits 88 may be connected to the left surge tank 20 and the right surge tank 22. The second fluid conduit(s) 88 connected to the first surge tank 20 may provide fluid communication from the first surge tank 20 to the left wing tank 14 and/or to the center tank 18. The second fluid conduit(s) 88 connected to the second surge tank 22 may provide fluid communication from the second surge tank 22 to the right wing tank 16 and/or to the center tank 18. For example and without limitation, the ECU 30 may operate the first fluid valve 24 and the second fluid valve 26 in bypass positions such that mixed air is provided from the left surge tank 20 and the right surge tank 22 to the main tanks 14, 16, 18 via the second fluid conduits 88.

With embodiments, a method of inerting aircraft fuel tanks may include providing an aircraft 100 having an aircraft fuel tank inerting system 10, at least one fuel tank 14, 16, 18, and/or at least one surge tank 20, 22. The aircraft fuel tank inerting system 10 may include at least one fluid valve 24, 26, 28 and an inert air assembly 12. The method may include operating the fluid valve(s) 24, 26, 28 in an open position during a climb phase of a flight to provide inert air 34 from the inert air assembly 12 to the fuel tank(s) 14, 16, 18. The method may include operating the fluid valve(s) 24, 26, 28 in a closed position during a cruise phase of the flight if the fuel tank(s) 14, 16, 18 has achieved an inert margin above a threshold. The method may include operating the fluid valve(s) 24, 26, 28 in a bypass position during a descent phase of the flight to provide inert air 34 to the surge tank 20, 22. The method may include mixing inert air 34 from the inert air assembly 12 with ambient air in the surge tank 20, 22 to form mixed air. The mixed air may continue to mix in a second fluid conduit 88 that may be connected to the surge tank 20, 22 and the fuel tank 14, 16, 18. The method may include providing the mixed air to the fuel tank 14, 16, 18. The method may include operating the (first) fluid valve 24 and a second fluid valve 26 in bypass positions to provide mixed air from the (first) surge tank 20 to the (left wing) fuel tank 14, from a second surge tank 22 to a second (right wing) fuel tank 16, and/or from both the (first) surge tank 20 and the second surge tank 22, via second fluid conduits 88, to a third (center) fuel tank 18. The method may include operating the fluid valve(s) 24, 26, 28 in the closed position if the aircraft 100 is on the ground. One or more portions of the method may be implemented/carried out via the ECU 30.

With some designs, outside/ambient air may be provided directly to the main tanks from the surge tank, and inert air may be separately provided to the main tanks. The ambient air may be provided to the main tanks at one or more discrete locations. As the ambient air may include high levels of oxygen, the flow of ambient air into the tanks may result in areas/pockets of higher concentrations of oxygen in the main tank, which may be referred to as "hot spots". To limit the effect of this arrangement, the air in the main tank may be maintained at an even lower level of oxygen to compensate for ambient air, which may involve providing additional inert air to the main tank. Providing additional inert air to the main tank may involve increasing the capacity and/or duty cycle of an inert air assembly (e.g., increasing the number of ASMs).

In contrast, with embodiments of the aircraft fuel tank inerting system 10, ambient air may not be provided directly to the main tanks 14, 16, 18. Instead, the ambient air may be pre-mixed with inert air 34 such that the air entering the main tanks 14, 16, 18 (e.g., mixed air) has a reduced oxygen concentration, which may limit and/or prevent the generation of hot spots. With such embodiments, the maximum capacity of the inert air assembly may be reduced, which may reduce the weight of the inert air assembly (e.g., the inert air assembly may include fewer ASMs which may weigh about 30 lbs. each). Additionally or alternatively, the duty cycle of the inert air assembly 12 may be reduced as a result of a lower demand for inert air, which may increase the life cycle of the inert air assembly 12.

In embodiments, an ECU 30 may include an electronic controller and/or include an electronic processor, such as a programmable microprocessor and/or microcontroller. In embodiments, an ECU 30 may include, for example, an application specific integrated circuit (ASIC). An ECU 30 may include a central processing unit (CPU), a memory (e.g., a non-transitory computer-readable storage medium), and/or an input/output (I/O) interface. An ECU 30 may be configured to perform various functions, including those described in greater detail herein, with appropriate programming instructions and/or code embodied in software, hardware, and/or other medium. In embodiments, an ECU 30 may include a plurality of controllers. In embodiments, an ECU may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An aircraft fuel tank inerting system, comprising:
   at least one fuel tank including a left wing fuel tank, a right wing fuel tank, and a center fuel tank;
   at least one surge tank including a left surge tank and a right surge tank;
   an inert air assembly;
   at least one fluid valve connected to the at least one fuel tank, the at least one surge tank, and the inert air assembly, wherein the at least one fluid valve includes a first fluid valve, a second fluid valve, and a third fluid valve; and
   an electronic control unit;
   wherein the electronic control unit is configured to control the at least one fluid valve to provide inert air from the inert air assembly to the at least one fuel tank or to the surge tank.

2. The aircraft fuel tank inerting system of claim 1, wherein the electronic control unit is configured to control the at least one fluid valve to provide the inert air from the inert air assembly to the at least one fuel tank during a climb phase of a flight, and control the at least one fluid valve to provide the inert air from the inert air assembly to the at least one surge tank during a descent phase of the flight.

3. The aircraft fuel tank inerting system of claim 2, wherein the electronic control unit is configured to control the at least one fluid valve such that during the descent phase, mixed air provided from the at least one surge tank to the at least one fuel tank includes less than about 20% oxygen.

4. The aircraft fuel tank inerting system of claim 3, wherein the electronic control unit is configured to control the at least one fluid valve such that during the descent phase, mixed air provided from the at least one surge tank to the at least one fuel tank includes about 16% or less oxygen.

5. The aircraft fuel tank inerting system of claim 2, wherein the electronic control unit is configured to operate the at least one fluid valve in a closed position during a cruise phase of the flight if the at least one fuel tank has achieved an inert margin above a threshold.

6. The aircraft fuel tank inerting system of claim 1, wherein the electronic control unit is configured to close the at least one fluid valve if the electronic control unit determines that an aircraft to which the electronic control unit is connected is on the ground.

7. The aircraft fuel tank inerting system of claim 1, wherein the electronic control unit, wherein the electronic control unit is configured wherein the electronic control unit is configured to:
   operate the first fluid valve, the second fluid valve, and/or the third fluid valve in an open position during a climb phase of a flight to provide inert air to the left wing fuel tank, the right wing fuel tank, and/or the center fuel tank;
   operate the first fluid valve, the second fluid valve, and/or the third fluid valve in a closed position if the left wing fuel tank, the right wing fuel tank, and/or the center fuel tank has achieved an inert margin above a threshold; and operate the first fluid valve and/or the second fluid valve in a bypass position during a descent phase of the flight to provide inert air to the left surge tank and/or the right surge tank.

8. A method of inerting one or more aircraft fuel tanks, the method comprising:
   operating at least one fluid valve of an aircraft in an open position during a climb phase of a flight to provide inert air to at least one fuel tank of the aircraft from an inert air assembly of the aircraft;
   operating the at least one fluid valve in a closed position during a cruise phase of the flight if the at least one fuel tank has achieved an inert margin above a threshold;
   operating the at least one fluid valve in a bypass position during a descent phase of the flight to provide inert air to at least one surge tank of the aircraft;
   determining the aircraft is on a ground; and
   operating the at least one fluid valve in the closed position in response to determining that the aircraft is on the ground.

9. The method of claim 8, including:
   mixing inert air from the inert air assembly with ambient air in the at least one surge tank to form mixed air; and
   providing the mixed air to the at least one fuel tank.

10. The method of claim 8, wherein determining that the aircraft is on the ground comprises receiving an indication that the aircraft is on the ground from a sensor.

11. The method of claim 10, wherein the sensor comprises a weight on wheels sensor.

12. An aircraft comprising:
   at least one engine;
   a left wing and a right wing;
   a left wing fuel tank in the left wing and a right wing fuel tank in the right wing;
   a center fuel tank;
   a left surge tank in the left wing and a right surge tank in the right wing;
   an inert air assembly;
   a first fluid valve connected to the left wing fuel tank, the left surge tank, and the inert air assembly;
   a second fluid valve connected to the right wing fuel tank, the right surge tank, and the inert air assembly;
   a third fluid valve connected to the center fuel tank and the inert air assembly; and
   an electronic control unit;
   wherein the electronic control unit is configured to control the first fluid valve to provide inert air from the inert air assembly to the left wing fuel tank or to the left surge tank, to control the second fluid valve to provide inert air from the inert air assembly to the right wing fuel tank or to the right surge tank, and to control the third fluid valve to provide inert air from the inert air assembly to the center fuel tank.

13. The aircraft of claim 12, wherein the electronic control unit is configured to control the first fluid valve and/or the second fluid valve to provide the inert air from the inert air assembly to the left wing fuel tank and/or the right wing fuel tank during a climb phase of a flight, and control the first fluid valve and/or the second fluid valve to provide the inert air from the inert air assembly to the left surge tank and/or the right surge tank during a descent phase of the flight.

14. The aircraft of claim 13, wherein the electronic control unit is configured to control the first fluid valve and/or the second fluid valve such that during the descent phase, mixed air provided from the left surge tank and/or the right surge tank to the left wing fuel tank and/or the right wing fuel tank includes less than about 20% oxygen.

15. The aircraft of claim 13, wherein the electronic control unit is configured to operate the first fluid valve and/or the second fluid valve in a closed position during a cruise phase of the flight if the left wing fuel tank and/or the right wing fuel tank has achieved an inert margin above a threshold.

16. The aircraft of claim 12, wherein the electronic control unit is configured to close the first fluid valve and/or the second fluid valve if the electronic control unit determines that an aircraft to which the electronic control unit is connected is on the ground.

17. The aircraft of claim 12, wherein the electronic control unit is configured to control the third fluid valve to provide the inert air from the inert air assembly to the center fuel tank during a climb phase of a flight and fix alignment.

18. The aircraft of claim 12, wherein the electronic control unit is configured to operate the third fluid valve in a closed position during a cruise phase of the flight if the center fuel tank has achieved an inert margin above a threshold.

19. The aircraft of claim 12, wherein mixed air is provided from the left surge tank and/or the right surge tank to the center fuel tank.

\* \* \* \* \*